United States Patent [19]

Byram et al.

[11] 3,829,798

[45] Aug. 13, 1974

[54] CASCADE TRANSVERSAL-FILTER PHASE-COMPENSATION NETWORK

[75] Inventors: George W. Byram; Jeffrey M. Speiser, both of San Diego, Calif.

[73] Assignee: The United States of America as represented by the Secretary of the Navy, Washington, D.C.

[22] Filed: Oct. 15, 1973

[21] Appl. No.: 406,720

[52] U.S. Cl. .............................. 333/70 T, 333/28 R

[51] Int. Cl. ........ H03h 7/28, H03h 7/30, H04b 3/04

[58] Field of Search .................. 333/70 T, 28 R, 18; 328/167; 178/69 R

[56] References Cited

UNITED STATES PATENTS 3,631,232 12/1971 Perreault ...................... 333/70 T X

*Primary Examiner*—James W. Lawrence
*Assistant Examiner*—Marvin Nussbaum
*Attorney, Agent, or Firm*—Richard S. Sciascia; Ervin F. Johnston; John Stan

[57] ABSTRACT

A phase-compensation network, capable of modifying the phase response of a filter or network while leaving unchanged the amplitude response, comprising a cascaded combination of simple transversal filters, each of which comprises a delay line; at least one tapped weighted element whose input is connected to the delay line; and a signal summer whose input is connected to the outputs of the weighted elements. The elements of each simple transversal filter correspond to the values of the Bessel function of fixed argument and for successive integral indices of the order, including the zeroth order, only significant values of positive and negative indices of the order being used, the element corresponding to the zeroth order being in the center of its specific transversal filter. The output of one transversal filter constitutes the input to the next succeeding filter in the cascade, each transversal filter corresponding to one of a set of fixed arguments of a Bessel function of the first kind, the set of fixed arguments being obtained from the coefficients of a phase function when expressed in Fourier series form.

3 Claims, 5 Drawing Figures

ANOTHER EMBODIMENT OF A PHASE-COMPENSATION NETWORK.

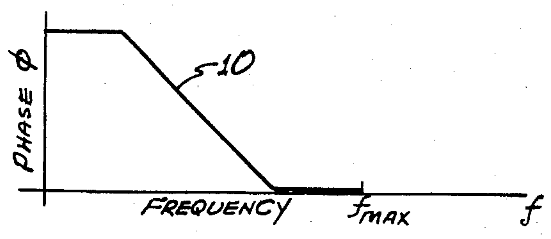
FIG. 1. ARBITRARY PHASE FUNCTION
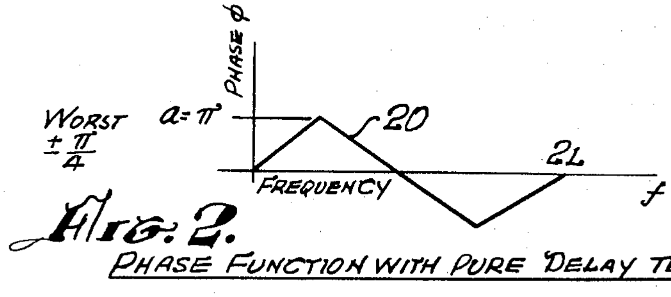
FIG. 2.
PHASE FUNCTION WITH PURE DELAY TERM REMOVED.
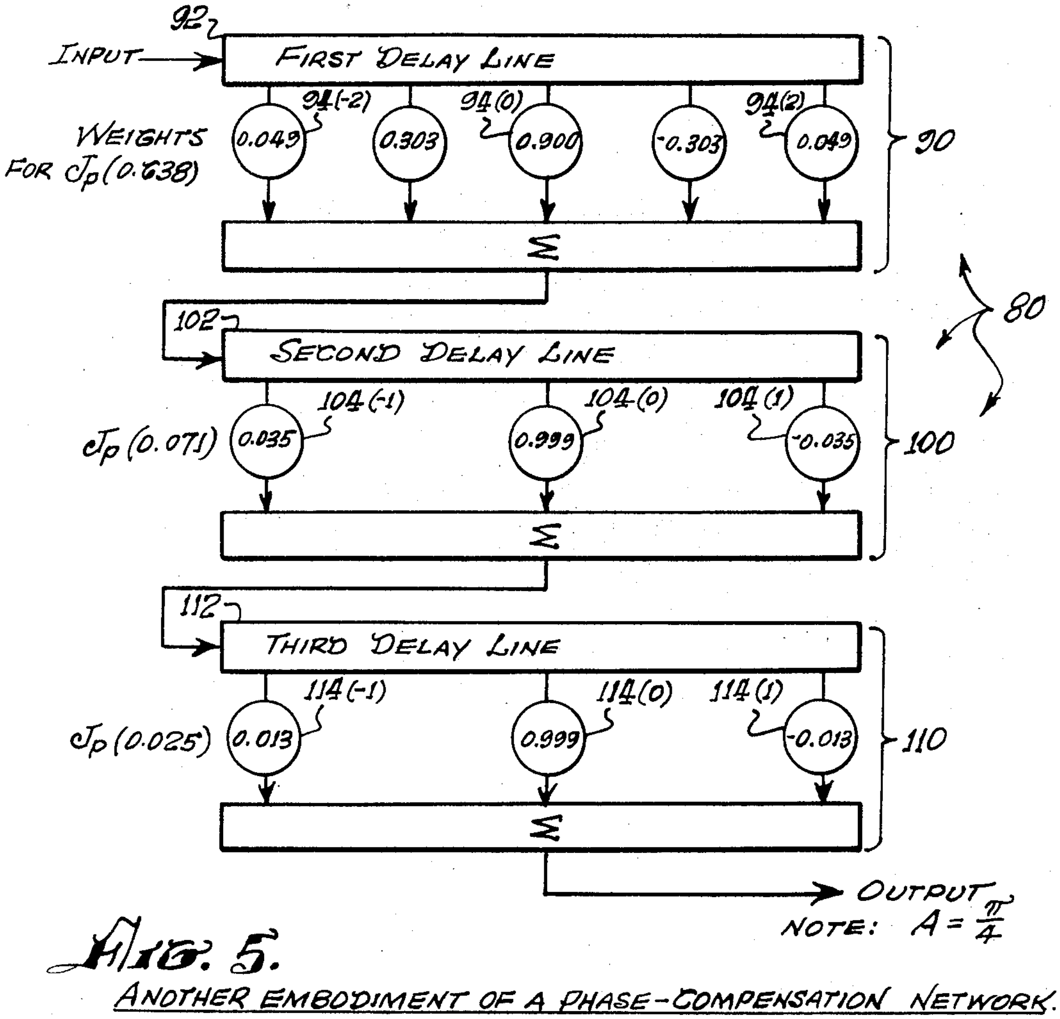
FIG. 5.
ANOTHER EMBODIMENT OF A PHASE-COMPENSATION NETWORK.

MAGNITUDE OF FOURIER COEFFICIENTS AS A FUNCTION OF THE INDEX.

PHASE-COMPENSATION NETWORK.

CASCADE TRANSVERSAL-FILTER PHASE-COMPENSATION NETWORK

STATEMENT OF GOVERNMENT INTEREST

The invention described herein may be manufactured and used by or for the Government of the United States of America for governmental purposes without the payment of any royalities thereon or therefor.

BACKGROUND OF THE INVENTION

This invention relates to a general linear filter with transfer function $H(f) = e^{i\phi(f)}$, i.e., a general all-pass or phase-compensation network, using a cascade combination of simple transversal filters.

Such a network may be used to modify the phase response of an existing network or filter, while leaving the amplitude response unchanged. Since the phase response of a filter, amplifier, or other linear system is critical in many signal processing applications, the invention has wide utility.

Arbitrary phase-compensation functions may be implemented in a very simple manner. A small total number of delay line taps is required, reducing the effect of the spurious dispersion which would otherwise be introduced by the taps themselves interacting with the propagating wave. Since each of the cascaded trasversal filters requires no more than 20 taps (and usually a very much smaller number of taps), the fabrication of the individual filters is relatively straightforward. Not only are the individual filters easy to build, but the computation of the required tap weights is very simple.

A small number of filters may be combined in various combinations to provide a large family of phase compensation functions.

DESCRIPTION OF THE PRIOR ART

The prior art techniques used in the area of a general all-pass or phase-compensation network generally fall into three categories: (a) lumped network synthesis; (b) dispersive delay lines; and (c) single transversal filters.

The design of a lumped network to have a prescribed phase response and uniform amplitude response is extremely difficult, and both the difficulty of design and the component sensitivity grow rapidly with the time-bandwidth product of the desired impulse response or transfer function.

While dispersive delay lines with high time-bandwidth products have been built, it is difficult to generate an arbitrary dispersion function by this method. The primary utility of this method is for obtaining filters matched to linear FM or quadratic FM signals.

The single transversal filter provides a more flexible method of synthesis than the lumped network or dispersive filter, in general only requiring a tapped delay line with 2TW independent taps, where TW is the time bandwith product of the desired impulse response. If the time-bandwidth product is sufficiently large, however, then this method of synthesis also becomes difficult to use for several reasons: (1) Tapped delay lines of sufficient length may not exist. For example, in the case of acoustic surface-wave delay lines, the length is limited by the size of the available crystals. (2) Unwanted attenuation and dispersion due to energy extracted from the wave in propagating past a large number of taps. (3) Secondary signal generation effects in an acoustic surface wave device. The acroustic wave may perturb the input voltage appearing across the launch transducer, thus launching a secondary acoustic wave.

This invention relates to a phase-compensation network, capable of modifying the phase response of a filter or network while leaving unchanged the amplitude response, comprising: a cascaded combination of simple transversal filters, each of which in turn comprises: a delay line; at least one tapped weighted element whose input is connected to the delay line; and a signal summer whose input is connected to the outputs of the weighted elements.

The elements of each simple transversal filter correspond to the values of the Bessel function of fixed arugment and for successive integral indices of the order, including the zeroth order. Only significant values of positive and negative indices of the order are used, the element corresponding to the zeroth order being in the center of its specific transversal filter. The elements corresponding to order plus 1 and minus 1, plus 2 and minus 2, and higher orders with their negatives, are symmetrically disposed about the central element, the polarity of two symmetrically disposed elements being the same if the index of the order is even, and unlike if the order is odd.

The output of one transversal filter constitutes the input to the next succeeding filter in the cascade. Each transversal filter corresponding to one of a set of fixed arguments of a Bessel function of the first kind, the set of fixed arguments being obtained from the coefficients of a phase function when expressed in Fourier series form.

OBJECTS OF THE INVENTION

An object of the invention is to provide a phase-compensation network which may be implemented in a very simple manner, since it requires use of a comparatively small number of taps.

Another object of the invention is to provide a phase-compensation network in which computation of the required tap weights, for each filter, is very simple.

Yet another object of the invention is to provide a filter which may be combined with other filters to provide a family of phase compensation functions.

Other objects, advantages and novel features of the invention will become apparent from the following detailed description of the invention, when considered in conjunction with the accompanying drawings, wherein:

BRIEF DESCRIPTION OF THE DRAWINGS

FIG. 1 is a graph of an arbitrary phase function.

FIG. 2 is a graph of a phase function with the pure delay term removed.

FIG. 5 is a block diagram of another embodiment of a phase-compensation network having relatively few taps.

DESCRIPTION OF THE PREFERRED EMBODIMENTS

Figure 3:
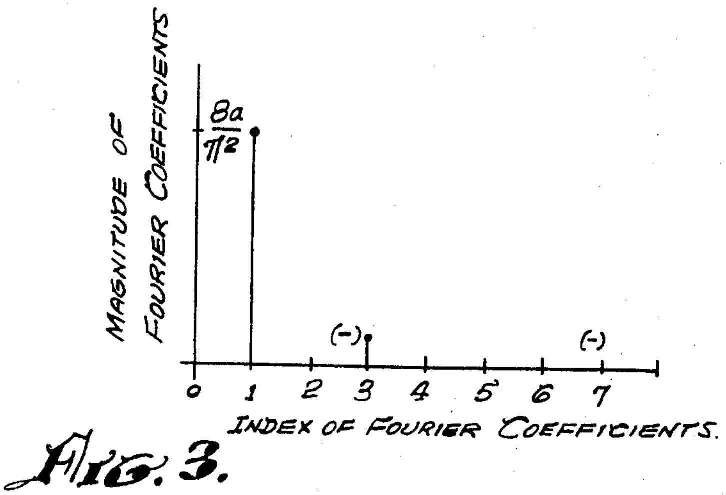
FIG. 3 is a graph showing the magnitude of the Fourier coefficients as a function of the index of the Fourier coefficients.

Before discussing specific embodiments, it should prove useful to explain the theory behind the invention.

Let the desired filter transfer function be $H(f) = e^{i\phi(f)}$. First, suppose that the filter may be realized (in principle) by a single transversal filter with tap spacing $d$, and impulse response $$h(t)=\sum_k h_k\delta(t-kd),$$

where $\delta(t)$ is the Dirac delta function. From which it follows that the corresponding transfer function in Fourier transform form is $$H(f)=\int e^{-i2\pi ft}h(t)dt=\sum_k h_k e^{-i2\pi kfd},$$

which is a periodic function of frequency, with period $d^{-1}$. Since $h(t)$ is real, $H(-f) = H^*(f)$, where the asterisk denotes complex conjugation. This in turn requires that $\phi(f)$ be an odd function of $f$ (modulo $2\pi$). Since $\phi$ is odd and periodic, it may be explained in a Fourier sine series:

$$\phi(f)=\sum_k z_k \sin 2\pi kfd.$$

For many phase functions of interest, it suffices to use a very few terms in the sine series expansion, say $$\phi(f)=\sum_{k=1}^{N} z_k \sin 2\pi kfd.$$

Then $$H(f)=e^{i\phi(f)}=\sum_{k=1}^{N} e^{iz_k\sin 2\pi kfd}=\sum_{k=1}^{N} H_k(f).$$

The product on the right side of the above equation corresponds to the cascade combination of N time-invariant linear filters. It will be shown hereinbelow that each may be realized as a transversal filter using a tapped delay line with a very small number of taps, and it will be shown how to calculate the required tap weights.

The transfer function of the kth cascade filter is $H_k(f) = e^{iz_k} \sin 2\pi kfd$. Since this is a periodic function of frequency, with period $d^{-1}$, it may be represented in a complex Fourier series:

$$H_k(f)=\sum_n g_n e^{-i2\pi kfd}$$

$$\text{where } g_n=d\int_0^{d^{-1}} H_k(f)e^{i2\pi fnd}df$$

$$=d\int_0^{d^{-1}} e^{iz_k\sin 2\pi kfd}e^{i2\pi fnd}df$$

It is noted that $H_k(f)$ is the transfer function of a transversal filter with impulse response $$\sum_n g_n\delta(t-nd)$$

But it may be shown that $g_{-mk} = J_m(z_k)$, where $J_m$ denotes the $m$th Bessel function of the first kind, and $g_n = 0$ whenever n is not a multiple of $k$.

The $-mk$ term indicates that at multiples of $k$, $k$ being an integer, as well as $m$, $g_{-mk}$ equals $J_m(z_k)$, that is, for every integer value of $m$ and $k$, $g_{-mk} = J_m(z_k)$. $g_n=0$, whenever $n$ is not a multiple of $k$.

The $mk$ term has a minus sign, otherwise the reversal of the tap weights would comprise the Bessel function.

Each $z_k$ is less than $\pi$ in absolute value. But for such moderate arguments, the Bessel functions fall off rapidly in magnitude as the order is increased, resulting in very few taps being needed for each of the cascaded transversal filters.

Referring now to FIG. 1, the phase response shown in curve 10 of FIG. 1 is the design objective, ignoring the realization delays, which introduce a linear phase trend. The design is involved with curve 20 of FIG. 2, but the curve eventually realized resembles curve 10 in FIG. 1, because of the presence of the realization delay.

A comparison of the curve 10 shown in FIG. 1 with that, curve 20, shown in FIG. 2, reveals that both curves are similar in shape, but that curve 20 is rotated with respect to curve 10, in a manner such that both end points are on the $\phi$ axis.

The equation for curve 20 in FIG. 2 is $$\phi(f)=\frac{8}{\pi^2}\sum_{n=1,3,5,\ldots}\frac{(-1)^{\frac{(n-1)}{2}}}{n^2}\sin\frac{n\pi x}{L}$$

$$=\frac{8}{\pi^2}\sum_{n=1,3,5,\ldots}\frac{(-1)^{\frac{(n-1)}{2}}}{n^2}\sin\frac{2n\pi f}{f_{max}},$$

relation $x/2L = f/f_{max}$. It is convenient to multiply the right hand side of the equation by the parameter a designating the maximum phase deviation.

The equation for $\phi(f)$ is the standard Bessel sequence for the curve shown in FIG. 2, and may be obtained from a standard mathematical handbook.

In the equation for $\phi(f)$ it will be noted that only odd terms are involved. Therefore, the tap weights would correspond only to the odd order terms. Effectively, FIG. 3 shows only the magnitude of the terms, with the minus signs (−) indicating when the term is negative. As shown, the magnitude for the 7 term is negligible.

Figure 4:
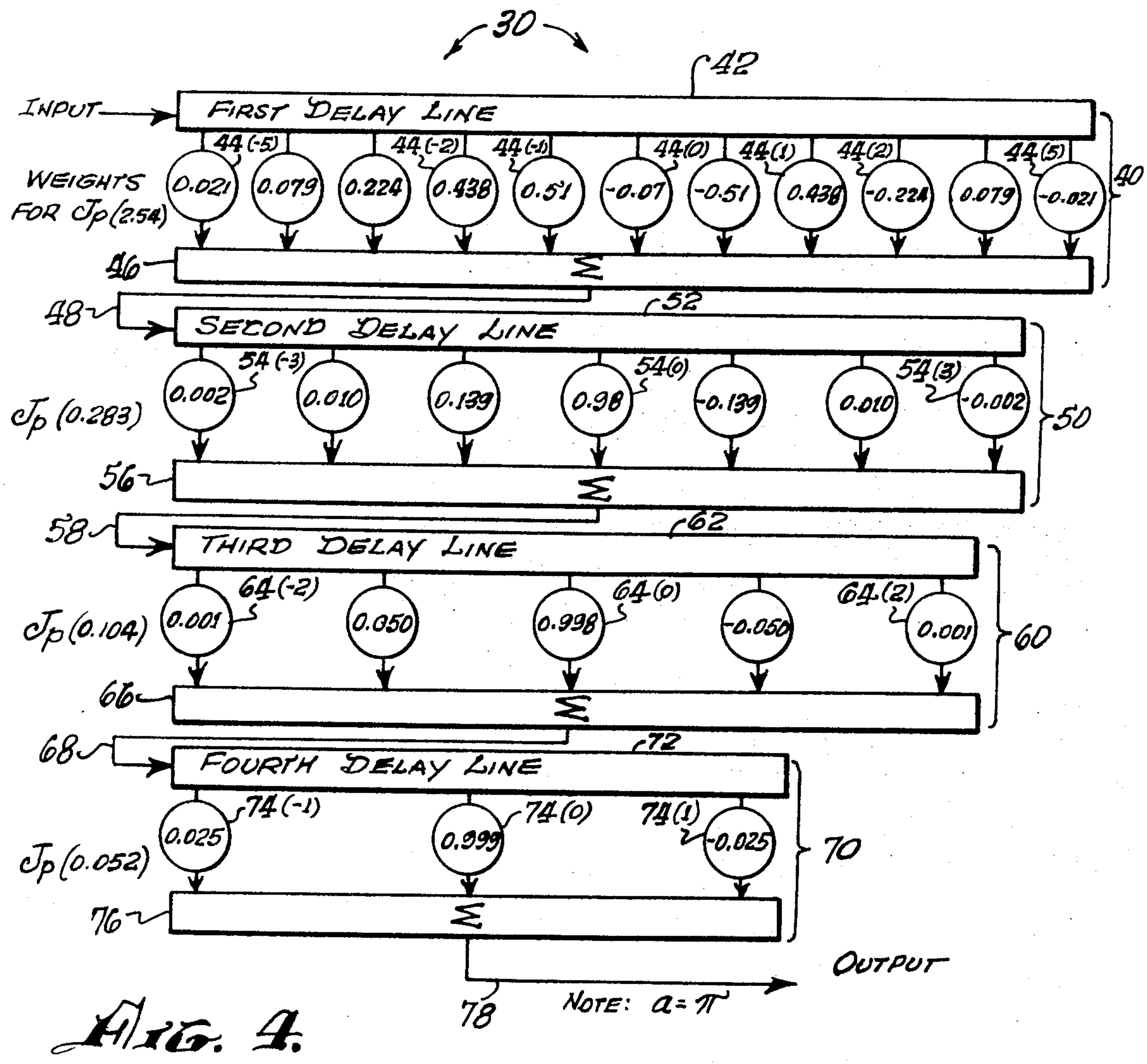
FIG. 4 is a block diagram of a phase-compensation network.

Then for the $a = \pi$ case, the coefficients become:

$8/\pi$ — 2.544, $8/9\pi$ — 0.283, $8/25\pi$ — 0.104, $8/49\pi$ — 0.052,

The above coefficients are used in the embodiment 30 shown in FIG. 4.

For the $a = \pi/4$ case, the coefficients become:

$8/4\pi$ — 0.638, $8/36\pi$ — 0.0708, $8/100\pi$ — 0.0254, $8/196\pi$ — 0.013

The immediately above coefficients are used in the embodiment 80.

For the above values of $J_p(x)$, the following two tables of values may be determined, as a function of the index $p$.

| P | $J_p(2.54)$ | $J_p(0.283)$ | $J_p(0.104)$ | $J_p(0.052)$ |
|---|---|---|---|---|
| 0 | −0.0742 | 0.98 | 0.998 | 0.999 |
| 1 | 0.510 | 0.139 | 0.05 | 0.025 |
| 2 | 0.438 | 0.010 | 0.0012 | 0.0006 |
| 3 | 0.224 | 0.0023 | 0.00001 | |
| 4 | 0.079 | | | |
| 5 | 0.021 | | | |
| 6 | 0.0005 | | | |

| P | $J_p(0.638)$ | $J_p(0.071)$ | $J_p(0.025)$ |
|---|---|---|---|
| 0 | 0.900 | 0.999 | 0.999 |
| 1 | 0.303 | 0.035 | 0.013 |
| 2 | 0.0494 | 0.001 | 0.0003 |
| 3 | 0.00055 | | |

Referring mow to FIG. 4, therein is shown a phase-compensation network 30, capable of modifying the phase response of a filter or network while leaving unchanged the amplitude response, comprising a cascaded combination of simple transversal filters, 40, 50, 60 or 70, each of which comprises a delay line, 42, 52, 62 or 72; at least one tapped weighted element, 44, 54, 64 or 74, whose input is connected to the delay line; and a signal summer, 46, 56, 66 or 76, whose input is connected to the outputs of the weighted elements.

The elements, for example, 44(−5), . . . 44(0), . . . 44(5), of each simple transversal filter, for example, 40, correspond to the values of the Bessel function of fixed argument and for successive integral indices of the order, including the zeroth order, only significant values of positive and negative indices of the order being used. The element 44(0) corresponding to the zeroth order is in the center of its specific transversal filter 40, the elements corrsponding to orders plus 1 and minus 1, 44(1) and 44(−1), plus 2 and minus 2, 44(2) and 44(−2), and higher orders with their negatives, being symmetrically disposed about the central element, the polarity of two symmetrically disposed elements being the same if the index of the order is even, and unlike if the order is odd.

The output 48, 58 or 68, of one transversal filter, 40, 50 or 60, constitutes the input to the next succeeding filter, each transversal filter corresponding to one of a set of fixed arguments of a Bessel function of the first kind, the set of fixed arguments being obtained from the coefficients of a phase function when expressed in Fourier series form. The output 78 of the last signal summer 76 constitutes the output of the phase-compensation network 30.

In summary, in the phase-compensation network 30 in FIG. 4 or 80 in FIG. 5 the phase function expanded in a Fourier series may take the form of $$\phi(f)=\sum_k z_k \sin 2\pi k f d,$$

which, considering only significant values, may be truncated to $$\phi(f)=\sum_{k=1} z_k \sin 2\pi k f d.$$

The transfer function of the kth cascade filter is $$H_k(f)=\sum_n g_n e^{-i2\pi k f d},$$

where $g_{-mk}=J_m(Z_k)$, where $J_m$ denotes the $m$th Bessel function of the first kind, and $g_n=0$ whenever $n$ is not a multiple of $k$.

In FIG. 5 is shown a phase-compensation network 80 wherein the cascaded combination of transversal filters 90, 100 and 110, comprises three delay lines , 92, 102 and 112, each having a series of weighted elements, 94, 104 and 114, connected to it. One series of elements, 94(−2), . . . 94(0), . . . 94(2), weighted according to the Bessel function $J_p(0.638)$; another series of elements, 104(−1), 104(0) and 104(1), being weighted according to $J_p(0.071)$; and the third series of elements, 114(−1), 114(0) and 114(1), being weighted according to $J_p(0.025)$.

With respect to variations in embodiments of the invention, instead of simply truncating the Fourier sine series for the phase function $\phi(f)$, the phase function may be smoothed prior to taking the truncated expansion. Similarly a Cesaro approximating sum may be used. This requires only a minor modification of the design procedure, changing the arguments of the Bessel function used to select the taps weights.

The cascaded transversal filters may be implemented using acoustic surface wave delay lines, torsional magnetic delay lines, or any other tapped delay line with low dispersion, and lightly coupled, low-deflection taps.

Obviously many modifications and variations of the present invention are possible in the light of the above teachings. It is therefore to be understood that within the scope of the appended claims the invention may be practiced otherwise than as specifically described.

What is claimed is:

1. A phase-compensation network, capable of modifying the phase response of a filter or network while leaving unchanged the amplitude response, comprising:

a cascaded combination of simple transversal filters, each comprising:
- a delay line;
- at least one tapped weighted element whose input is connected to the delay line;
- the elements of each simple transversal filter corresponding to the values of the Bessel function of fixed argument and for successive integral indices of the order, including the zeroth order, only significant values of positive and negative indices of the order being used, the element corresponding to the zeroth order being in the center of its specific transversal filter, the elements corresponding to orders plus 1 and minus 1, plus 2 and minus 2, and higher orders with their negatives, being symmetrically disposed about the central element, the polarity of two symmetrically disposed elements being the same if the index of the order is even, and unlike if the order is odd; and
- a signal summer whose input is connected to the outputs of the weighted elements; and wherein the output of one transversal filter constitutes the input to the next succeeding filter in the cascade, each transversal filter corresponding to one of a set of fixed arguments of a Bessel function of the first kind, the set of fixed arguments being obtained from the coefficients of phase function when expressed in Fourier series form.

2. The phase-compensation network according to claim 1, wherein:

the form of the phase function expanded in a Fourier series is $$\phi(f)=\sum_{k} z_k \sin 2\pi kfd,$$

which, considering only significant values, may be truncated to $$\phi(f)=\sum_{k=1}^{N} z_k \sin 2\pi kfd;$$

and the transfer function of the kth cascade filter is $$H_k(f)=\sum_{n} g_n e^{-i2\pi kfd},$$

where $g_{-mk}=J_m(Z_k)$, where $J_m$ denotes the mth Bessel function of the first kind, and $g_n=0$ whenever $n$ is not a multiple of $k$.

3. The phase-compensation network according to claim 2, wherein the cascaded combination of transversal filters comprises three delay lines, each having a series of weighted elements connected it;

one series of elements being weighted according to the Bessel function $J_p(0.638)$;

another series of elements being weighted according to $J_p(0.071)$; and the third series of elements being weighted according to $J_p(0.025)$.

* * * * *